United States Patent
Ro et al.

(10) Patent No.: US 12,321,278 B2
(45) Date of Patent: Jun. 3, 2025

(54) SWAP MEMORY DEVICE PROVIDING DATA AND DATA BLOCK, METHOD OF OPERATING THE SAME, AND METHOD OF OPERATING ELECTRONIC DEVICE INCLUDING THE SAME

(71) Applicant: Samsung Electronics Co., Ltd., Suwon-si (KR)

(72) Inventors: Won Woo Ro, Seoul (KR); Hyoseong Choi, Seoul (KR); Jiwon Lee, Seoul (KR); Jeonghoon Choi, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 18/350,148

(22) Filed: Jul. 11, 2023

(65) Prior Publication Data
US 2024/0152461 A1    May 9, 2024

(30) Foreign Application Priority Data

Nov. 3, 2022    (KR) .......................... 10-2022-0145399

(51) Int. Cl.
G06F 12/0862    (2016.01)

(52) U.S. Cl.
CPC .. G06F 12/0862 (2013.01); *G06F 2212/1024* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17;
(Continued)

(56) References Cited

U.S. PATENT DOCUMENTS 6,983,467 B2 * 1/2006 Engstrom ............. G06F 9/4843
712/228
7,096,378 B2 * 8/2006 Stence ................. G11B 27/107
711/E12.019
(Continued)

FOREIGN PATENT DOCUMENTS

KR    101612922 B1    4/2016
KR    20180061851 A    6/2018

*Primary Examiner* — Daniel C. Chappell
(74) *Attorney, Agent, or Firm* — Myers Bigel, P.A.

(57) ABSTRACT

Disclosed is a method of operating a swap memory device configured to communicate with a host device and a main memory device. The method includes receiving, from the host device, a request corresponding to target data, determining, by the swap memory device, a first address of the target data and a second address of a target data block that includes the target data, based on the request, providing, by the swap memory device, the target data to the host device based on the first address, and providing, by the swap memory device, the target data block to the main memory device based on the second address.

14 Claims, 14 Drawing Sheets

(58) Field of Classification Search
CPC ........... G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75

See application file for complete search history.

(56) References Cited

U.S. PATENT DOCUMENTS

| | | | |
|---|---|---|---|
| 7,178,068 B2* | 2/2007 | Maison | G06F 11/0763 |
| | | | 714/45 |
| 7,421,533 B2* | 9/2008 | Zimmer | G06F 12/126 |
| | | | 711/170 |
| 7,761,687 B2* | 7/2010 | Blumrich | G06F 15/17337 |
| | | | 712/11 |
| 8,892,844 B2* | 11/2014 | Walker | G06F 3/0604 |
| | | | 711/170 |
| 9,251,087 B2* | 2/2016 | Nellans | G06F 12/10 |
| 9,563,382 B2 | 2/2017 | Hahn et al. | |
| 9,886,194 B2* | 2/2018 | Zheng | G06F 3/0605 |
| 10,095,626 B2* | 10/2018 | Kotte | G06F 12/0868 |
| 10,134,471 B2* | 11/2018 | Chinnaswamy | G11C 7/1072 |
| 10,157,008 B2 | 12/2018 | Chun et al. | |
| 10,303,617 B2 | 5/2019 | Kim et al. | |
| 10,496,334 B2* | 12/2019 | Myran | G06F 12/1009 |
| 10,915,458 B1* | 2/2021 | Lercari | G06F 12/0207 |
| 11,068,409 B2* | 7/2021 | Li | G06F 3/0658 |
| 11,074,189 B2* | 7/2021 | Abulila | G06F 12/0893 |
| 11,138,066 B1 | 10/2021 | Gorobets et al. | |
| 11,204,797 B2* | 12/2021 | Kim | G06F 12/0246 |
| 11,698,859 B2* | 7/2023 | Barczak | G06F 3/061 |
| | | | 711/202 |
| 11,762,569 B2* | 9/2023 | Stoica | G06F 3/0685 |
| | | | 711/154 |
| 11,914,523 B1* | 2/2024 | Lercari | G06F 12/0246 |
| 12,001,702 B2* | 6/2024 | Matsuda | G06F 3/0679 |
| 2005/0055528 A1* | 3/2005 | Arimilli | G06F 12/1027 |
| | | | 711/E12.019 |
| 2005/0273571 A1* | 12/2005 | Lyon | G06F 9/45537 |
| | | | 711/203 |
| 2007/0294496 A1* | 12/2007 | Goss | H04W 12/102 |
| | | | 711/163 |
| 2008/0082751 A1* | 4/2008 | Okin | G06F 12/0246 |
| | | | 711/E12.001 |
| 2009/0248959 A1* | 10/2009 | Tzeng | G06F 12/08 |
| | | | 711/206 |
| 2009/0327621 A1* | 12/2009 | Kliot | G06F 12/0253 |
| | | | 711/E12.002 |
| 2010/0082892 A1* | 4/2010 | Ma | G06K 19/07354 |
| | | | 711/E12.001 |
| 2010/0115204 A1* | 5/2010 | Li | G06F 12/0846 |
| | | | 711/E12.017 |
| 2010/0312955 A1 | 12/2010 | Hwang et al. | |
| 2011/0153916 A1* | 6/2011 | Chinnaswamy | G11C 11/005 |
| | | | 711/E12.001 |
| 2012/0210095 A1* | 8/2012 | Nellans | G06F 12/1072 |
| | | | 711/E12.059 |
| 2012/0284587 A1* | 11/2012 | Yu | G06F 12/0868 |
| | | | 711/E12.008 |
| 2013/0275661 A1* | 10/2013 | Zimmer | G06F 12/0653 |
| | | | 711/103 |
| 2013/0297880 A1* | 11/2013 | Flynn | H05K 7/1444 |
| | | | 711/135 |
| 2013/0318196 A1* | 11/2013 | Yamamoto | G06F 12/0893 |
| | | | 709/215 |
| 2014/0281151 A1* | 9/2014 | Yu | G11C 29/52 |
| | | | 711/103 |
| 2014/0310574 A1* | 10/2014 | Yu | G06F 12/0871 |
| | | | 714/773 |
| 2015/0032951 A1* | 1/2015 | Goss | H04L 9/0897 |
| | | | 711/105 |
| 2016/0320994 A1* | 11/2016 | Chun | G06F 3/0659 |
| 2019/0286465 A1* | 9/2019 | Cui | G06F 9/45533 |
| 2019/0391843 A1* | 12/2019 | Franciosi | G06F 12/1072 |
| 2020/0225980 A1* | 7/2020 | Kim | G06F 3/0607 |
| 2020/0241794 A1* | 7/2020 | Yeo | G06F 12/1408 |
| 2021/0034286 A1* | 2/2021 | Chung | G11C 7/10 |
| 2022/0035655 A1* | 2/2022 | Lin | G06F 9/4881 |
| 2022/0108764 A1* | 4/2022 | Ling | G11C 29/765 |
| 2023/0071475 A1* | 3/2023 | Waldspurger | G06F 12/0223 |
| 2023/0118797 A1* | 4/2023 | Kim | G06F 12/0868 |
| | | | 711/154 |
| 2023/0176980 A1* | 6/2023 | Li | G06F 12/123 |
| | | | 711/160 |
| 2024/0143220 A1* | 5/2024 | Guo | G06F 3/0604 |

* cited by examiner

SWAP MEMORY DEVICE PROVIDING DATA AND DATA BLOCK, METHOD OF OPERATING THE SAME, AND METHOD OF OPERATING ELECTRONIC DEVICE INCLUDING THE SAME

CROSS-REFERENCE TO RELATED APPLICATIONS

This application claims priority under 35 U.S.C. § 119 to Korean Patent Application No. 10-2022-0145399 filed on Nov. 3, 2022, in the Korean Intellectual Property Office, the disclosure of which is incorporated by reference herein in their entireties.

BACKGROUND

Embodiments of the present disclosure described herein relate to a memory device, and more particularly, relate to a swap memory device providing data and a data block, a method of operating the same, and a method of operating an electronic device including the same.

A memory device stores data in response to a write request and outputs data stored therein in response to a read request. For example, the memory device is classified as a volatile memory device, which loses data stored therein when a power supply is interrupted, such as a dynamic random access memory (DRAM) device or a static RAM (SRAM) device, or a non-volatile memory device, which retains data stored therein even when a power supply is interrupted, such as a flash memory device, a phase-change RAM (PRAM), a magnetic RAM (MRAM), or a resistive RAM (RRAM).

An electronic device may include a processor and memory devices of a multi-hierarchy structure. As the hierarchy of the memory device becomes higher, an operating speed of the memory device may become faster. As the hierarchy of the memory device becomes lower, a storage capacity of the memory device may become larger. A memory device of a higher hierarchy may pre-load data whose probability of use is predicted to be high. When data requested by the processor are not pre-loaded (i.e., when the prediction fails), the memory device may read data from another memory device of a lower layer. The latency necessary for data transmission between different layers may cause a decrease in processing speed.

SUMMARY

Embodiments of the present disclosure provide a swap memory device providing data and a data block, a method of operating the same, and a method of operating an electronic device including the same.

According to some embodiments, a swap memory device configured to communicate with a host device and a main memory device. A method of operating the swap memory device includes receiving, by the host device, a request corresponding to target data, determining, by the swap memory device, a first address of the target data and a second address of a target data block that includes the target data, based on the request, providing, by the swap memory device, the target data to the host device based on the first address, and providing, by the swap memory device, the target data block to the main memory device based on the second address.

According to some embodiments, an electronic device includes a host device, a main memory device, and a swap memory device. A method of operating the electronic device includes determining, by the host device, whether a page fault of target data occurs where the page fault occurs when the target data is not found in the main memory device, providing, by the host device, a first request corresponding to the target data to the swap memory device, in response to determining that the page fault has occurred, determining, by the swap memory device, a first address of the target data and a second address of a target data block that includes the target data, based on the first request, providing, by the swap memory device, the target data to the host device based on the first address, and providing, by the swap memory device, the target data block to the main memory device based on the second address.

According to some embodiments, a swap memory device includes an input/output (I/O) circuit that includes an input buffer, a first data path, and a second data path, a volatile memory device that stores a plurality of data blocks, and a memory controller. The memory controller is configured to perform operations including receiving a request corresponding to target data of a target data block among the plurality of data blocks from a host device through the input buffer, determining a first address of the target data and a second address of the target data block, based on the request, providing the target data to the host device through the first data path of the I/O circuit, based on the first address, and providing the target data block to a main memory device through the second data path of the I/O circuit, based on the second address.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
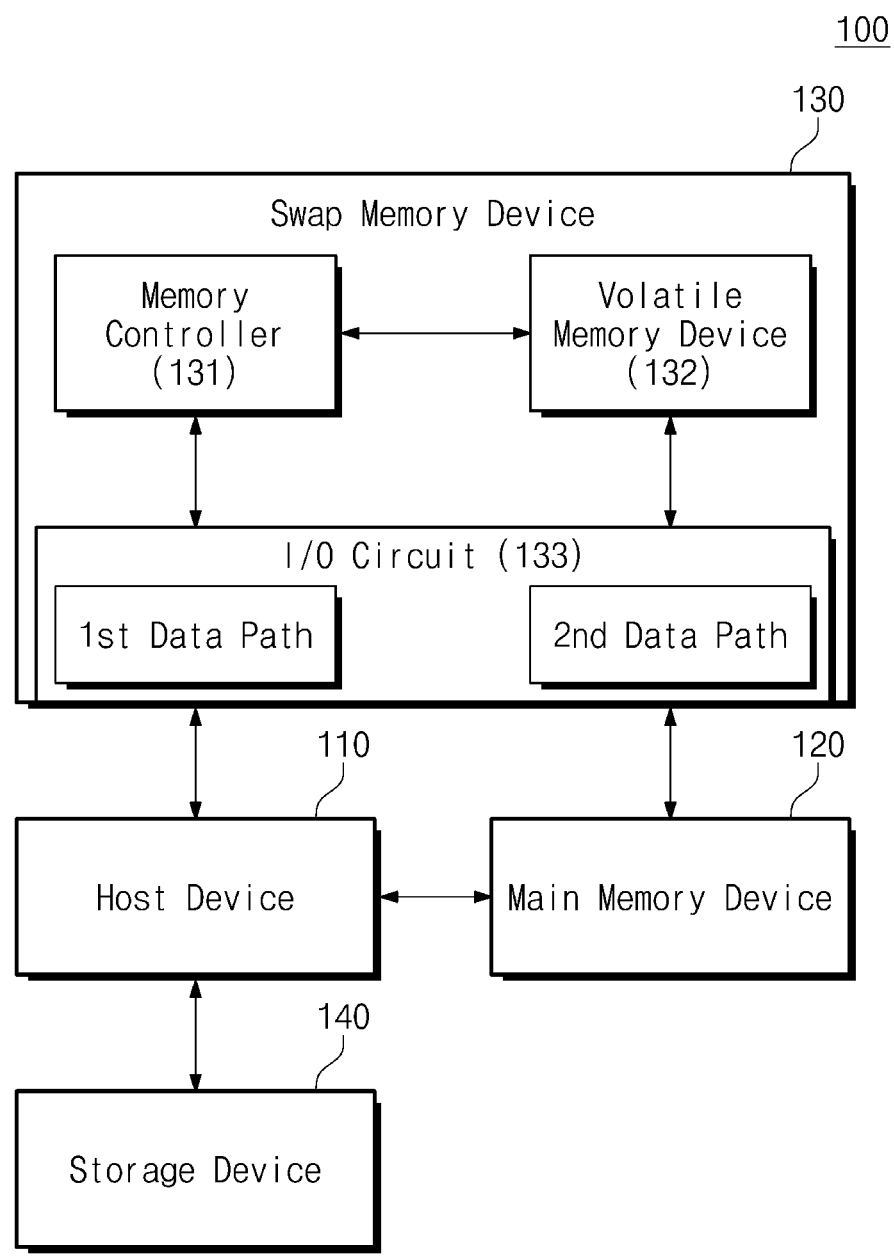
FIG. 1 is a block diagram of an electronic device according to some embodiments of the present disclosure.

Below, embodiments of the present disclosure will be described in detail and clearly to such an extent that one skilled in the art implements embodiments of the present disclosure easily.

Components described in the detailed description with reference to terms such as "part", "unit", "module", "layer", etc. and function blocks illustrated in the drawings may be implemented in the form of software, hardware, or a combination thereof. For example, the software may be a machine code, firmware, an embedded code, and/or application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

FIG. 1 is a block diagram of an electronic device according to some embodiments of the present disclosure. Referring to FIG. 1, an electronic device 100 may include a host device 110, a main memory device 120, a swap memory device 130, and a storage device 140. The electronic device 100 may be a computing system, which is configured to process a variety of information, such as a personal computer (PC), a notebook, a laptop, a server, a workstation, a tablet PC, a smartphone, a digital camera, and a black box.

The host device 110 may control an overall operation of the electronic device 100. The host device 110 may store data in the main memory device 120, the swap memory device 130, and the storage device 140 or may read the stored data therefrom. The host device 110 may perform data processing. For example, the host device 110 may include a processor, a register, and a cache memory.

Under control of the host device 110, the main memory device 120 may store data or may provide data stored therein to the host device 110. For example, under control of the host device 110, the main memory device 120 may load data stored in the storage device 140. The main memory device 120 may store data provided from the host device 110 or may provide the stored data to the host device 110.

The main memory device 120 may be implemented with a volatile memory device, which may be implemented separately from a volatile memory device 132. For example, the main memory device 120 may be implemented with a dynamic random access memory (DRAM), a synchronous DRAM (SDRAM), a static random access memory (SRAM), etc. The main memory device 120 may also be referred to as a "fast DRAM", and the volatile memory device may also be referred to as a "slow DRAM". Detailed descriptions of this will be provided below.

The hierarchy of the main memory device 120 may be higher than the hierarchy of the swap memory device 130. As the hierarchy becomes higher, an input/output (I/O) speed of data may become faster. As the hierarchy becomes lower, a storage capacity may become larger, and costs may become lower. The hierarchy of the main memory device 120 may be higher than the hierarchy of the storage device 140. For example, the main memory device 120 may be referred to as a "local DRAM" or a "fast DRAM".

Under control of the host device 110, the swap memory device 130 may store data or may provide the stored data to the host device 110. For example, under control of the host device 110, the swap memory device 130 may load data stored in the storage device 140. The swap memory device 130 may provide the stored data to the host device 110 and the main memory device 120.

The swap memory device 130 may provide a swap space to be used in a swap operation of the main memory device 120. The swap operation may indicate to access a memory device of any other hierarchy (e.g., any other volatile memory device or any other non-volatile memory device) when the capacity of the main memory device 120 is insufficient or necessary data are absent from the main memory device 120. The swap space may indicate a storage space to be used in the swap operation. The swap operation may be caused with respect to both the data read operation and the data write operation.

For example, when the host device 110 performs the read operation for target data for processing, under control of the host device 110, the main memory device 120 may pre-load data whose probability of call is predicted to be high. When a page fault occurs, that is, when the prediction fails, the data actually requested by the host device 110 may be different from the data pre-loaded to the main memory device 120. To secure the data requested by the host device 110 or data predicted as having a high probability to be used in the next processing, the main memory device 120 may perform the swap operation on any other memory device such as the swap memory device 130 or the storage device 140.

For example, when the host device 110 performs the write operation for target data generated as the processing result, a space of the main memory device 120, which is used to store the data, may be insufficient. To secure an additional storage space, the main memory device 120 may back up a portion of the data loaded to the main memory device 120 to the swap memory device 130 or the storage device 140 (i.e., may perform the swap operation) and may then delete the backed-up data from the main memory device 120.

The swap memory device 130 may include a memory controller 131, a volatile memory device 132, and an I/O circuit 133.

The memory controller 131 may control an overall operation of the swap memory device 130. The memory controller 131 may store data in the volatile memory device 132 or may provide the data stored in the volatile memory device 132 to the host device 110 and the main memory device 120 through the I/O circuit 133.

The volatile memory device 132 may be implemented with a dynamic random access memory (DRAM), a synchronous DRAM (SDRAM), a static random access memory (SRAM), etc. The hierarchy of the volatile memory device 132 may be lower than the hierarchy of the main memory device 120. The hierarchy of the volatile memory device 132 may be higher than the hierarchy of the storage device 140. For example, the volatile memory device 132 may be referred to as a "slow DRAM" or a "network-of-DRAM (NoD)".

The I/O circuit 133 may include a first data path and a second data path. The first data path may be used to provide data of a byte unit to the host device 110. The data transferred through the first data path may be used to again perform processing that the host device 110 fails in performing (e.g., page fault processing).

The size of the data transferred through the first data path, that is, a data transfer unit (i.e., a byte unit) of the first data path may be defined by the standard of the host device 110.

For example, the first data path may be connected with the cache memory of the host device 110 through a cache line. The byte unit may indicate the size of 64 bytes, but the present disclosure is not limited thereto.

The second data path may be used to provide a data block of a block unit to the main memory device 120. The block unit may be greater than the byte unit. The block unit may be referred to as a "page unit". The data block provided through the second data path may include data with a high probability of use in the next processing. The data loaded to the main memory device 120 through the second data path may be used in the next processing by the host device 110.

In some embodiments, the data block that is transferred through the second data path may include data that are transferred through the first data path.

The size of the data transferred through the second data path, that is, a data transfer unit (i.e., a block unit) of the second data path may be defined by the standard of the main memory device 120. For example, the block unit may be 4 kilobytes (KB) or 512 bytes, but the present disclosure is not limited thereto.

In some embodiments, the swap memory device 130 may support a parallel data transfer function, that is, the swap memory device 130 may provide data to the host device 110 through the first data path and may provide the data block to the main memory device 120 through the second data path in parallel with the transfer of the data to the host device 110.

For example, before the data block is completely transferred through the second data path, the swap memory device 130 may provide data to the host device 110 through the first data path. The latency necessary for re-execution of processing in the host device 110 may decrease. While transmitting data through the first data path, the swap memory device 130 may provide the data block to the main memory device 120 through the second data path in a background operation.

The storage device 140 may store data under control of the host device 110. For example, the storage device 140 may be implemented with a solid state drive (SSD), a hard disk drive (HDD), etc.

In some embodiments, the storage device 140 may be implemented as a non-volatile memory device. For example, the non-volatile memory device may be implemented with a NAND flash memory device, but the present disclosure is not limited thereto. For example, the non-volatile memory device may be one of various storage devices, which retain data stored therein even though a power is turned off, such as a phase-change random access memory (PRAM), a magnetic random access memory (MRAM), a resistive random access memory (RRAM), and a ferroelectric random access memory (FRAM).

The hierarchy of the storage device 140 may be lower than the hierarchy of the main memory device 120. The hierarchy of the storage device 140 may be lower than the hierarchy of the swap memory device 130.

As described above, according to embodiments of the present disclosure, the swap memory device 130 may provide data to the host device 110 through the first data path and may provide the data block to the main memory device 120 through the second data path. As the swap memory device 130 directly provides the data of the byte unit to the host device 110, the latency of a processor in the host device 110 to again perform processing may decrease. Also, as the swap memory device 130 provides the data block to the main memory device 120 in the background operation, the latency for the next processing may decrease.

Figure 2:
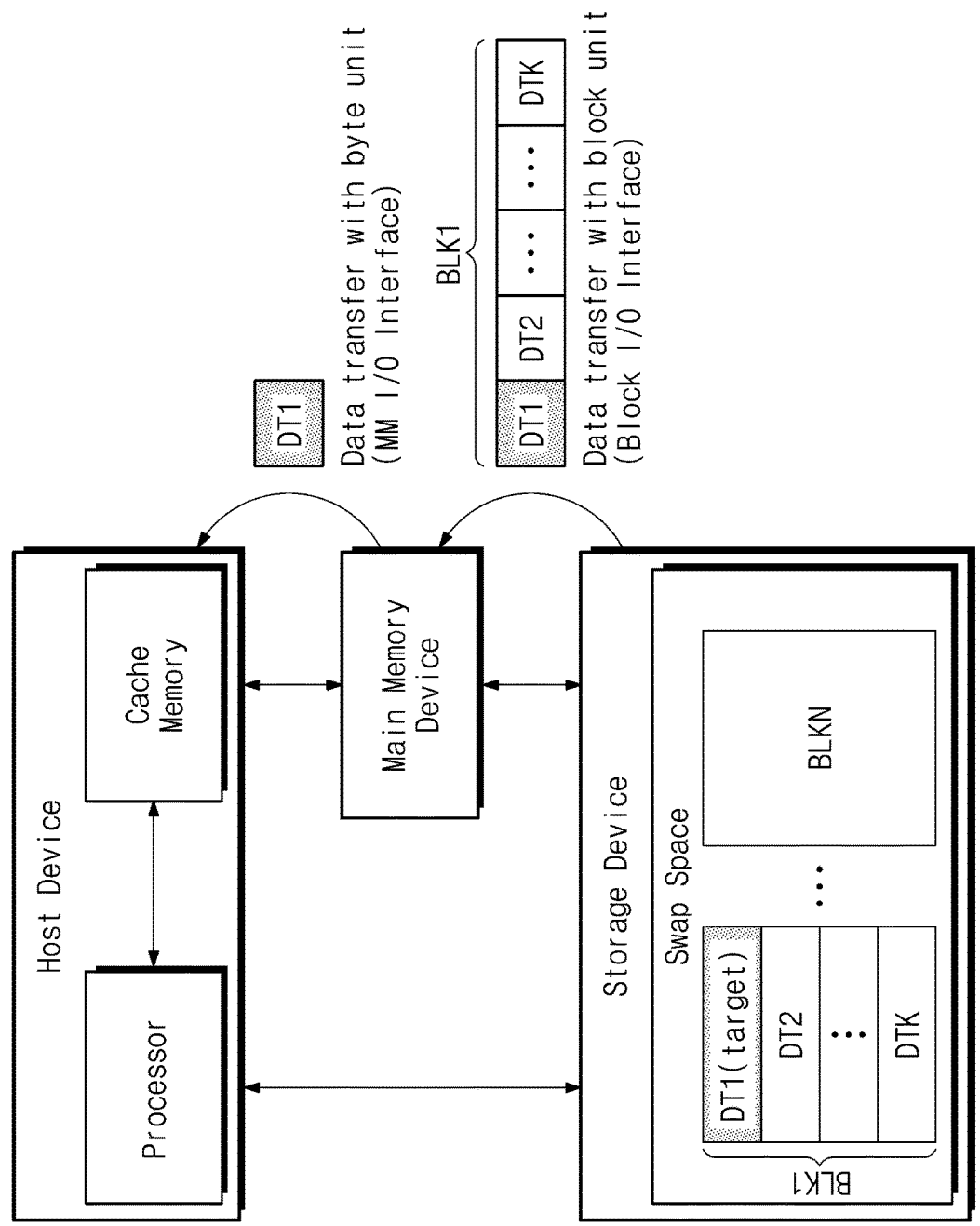
FIG. 2 is a diagram describing a data transfer of a conventional electronic device.

FIG. 2 is a diagram describing a data transfer of a conventional electronic device. Referring to FIG. 2, a conventional electronic device 10 may include a host device, a main memory device, and a storage device. For better understanding of the present disclosure, the conventional electronic device 10 will be described with reference to FIG. 2 without intending to limit the scope and spirit of the invention. The conventional electronic device 10 may include a component according to embodiments of the present disclosure.

The host device may include a processor and a cache memory. The processor may be implemented with a processing device such as a central processing unit (CPU), a graphic processing unit (GPU), a neural processing unit (NPU), or a digital signal processor (DSP). The cache memory may provide a cache space for the processor. The cache memory may communicate with the main memory device. The communication between the cache memory and the main memory device may use a memory mapped interface (MM I/O interface). The MM I/O interface may support a data transfer of a byte unit.

The main memory device may communicate with the cache memory of the host device and the storage device. The communication between the main memory device and the storage device may use a block input/output interface (block I/O interface). The block I/O interface may support a data transfer of a block unit.

The storage device may communicate with the host device and the main memory device. The storage device may provide the swap space for the main memory device. The swap space may include a plurality of data blocks BLK1 to BLKN. Each of the plurality of data blocks BLK1 to BLKN may include a plurality of data. Herein, "N" is an arbitrary natural number. For example, the first data block BLK1 may include a plurality of data DT1 to DTK. Herein, "K" is an arbitrary natural number. The first data DT1 among the plurality of data DT1 to DTK may be target data that are used in processing of the processor. The first data block BLK1 including the first data DT1 may be referred to as a "target data block".

Below, the data transfer of the conventional electronic device 10 will be described.

The processor may attempt to process the first data DT1. The first data DT1 may be data that are not loaded to the main memory device. The processor may fail in the processing of the first data DT1 that are not loaded to the main memory device. When the first data DT1 are absent from the main memory device, the processor may determine that the page fault for the first data DT1 occurs.

The processor may provide the storage device with a request indicating the movement of the first data block BLK1. The storage device may provide the first data block BLK1 in the swap space to the main memory device based on the request. The transfer of the first data block BLK1 from the storage device to the main memory device may be performed by using the block I/O interface in the block unit. After providing the first data block BLK1 to the main memory device, the storage device may provide the host device with a response providing notification that the request is processed.

The host device may provide the main memory device with the request for the first data DT1 based on the response received from the storage device. The main memory device may provide the main memory device with the first data DT1 in the first data block BLK1 that was loaded, based on the request. The transfer of the first data DT1 from the main memory device to the host device may be performed by using the MM I/O interface in the byte unit.

After the transfer of the first data DT1 from the main memory device to the cache memory is completed, the processor may again perform the processing of the first data DT1 loaded to the cache memory.

As described above, in the conventional electronic device 10, the operation in which the main memory device provides the first data DT1 to the host device may be performed after the storage device provides the first data block BLK1 including the first data DT1 to the main memory device. As the transfer of the first data DT1 to the host device is delayed, the latency in the conventional electronic device 10 may increase.

Figure 3:
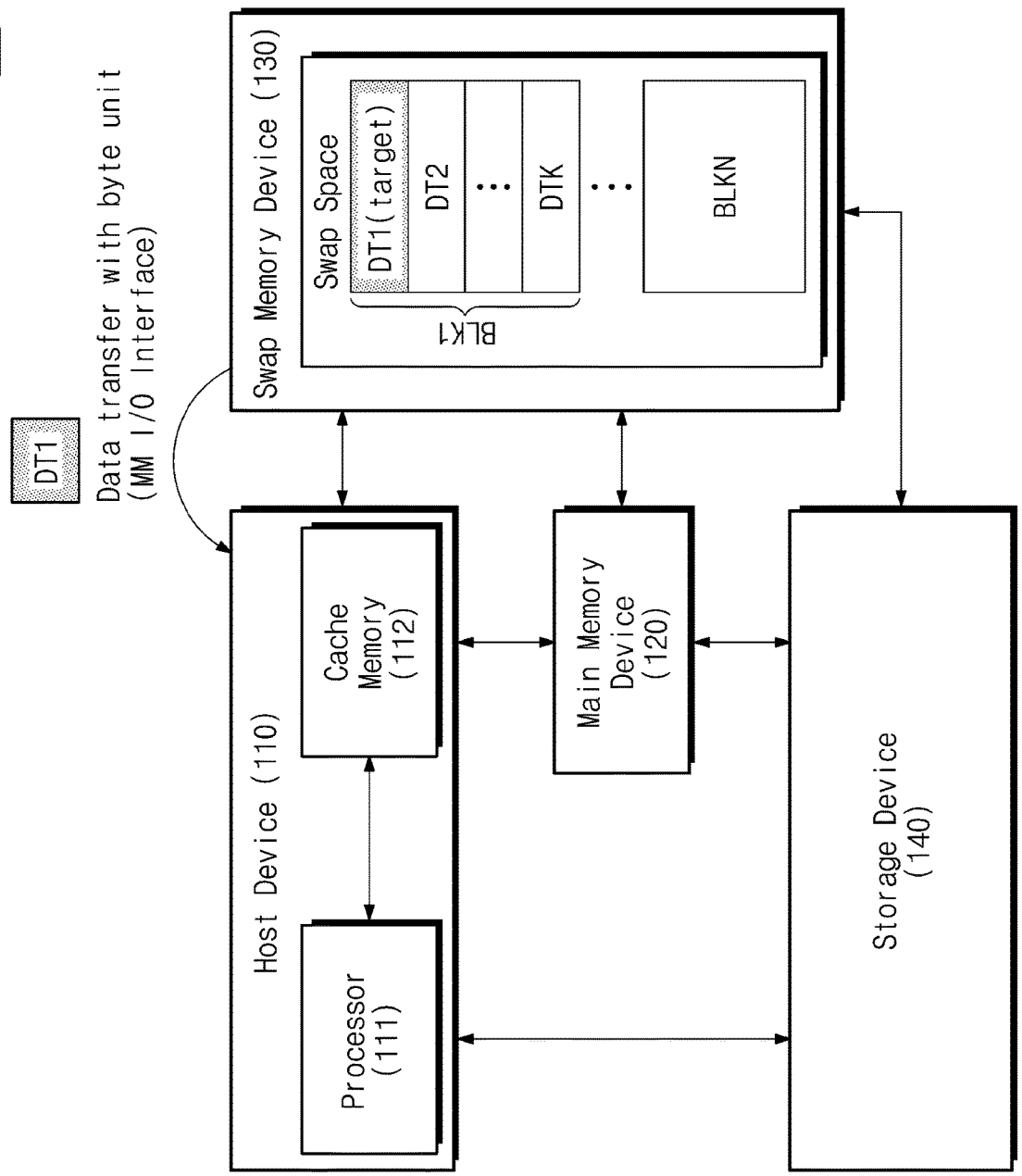
FIG. 3 is a diagram describing a data transfer of the electronic device of FIG. 1.

FIG. 3 is a diagram describing a data transfer of an electronic device of FIG. 1. Referring to FIG. 3, the electronic device 100 may include the host device 110, the main memory device 120, the swap memory device 130, and the storage device 140. The host device 110, the main memory device 120, the swap memory device 130, and the storage device 140 may respectively correspond to the host device 110, the main memory device 120, the swap memory device 130, and the storage device 140 of FIG. 1.

The host device 110 may include a processor 111 and a cache memory 112. The processor 111 may be implemented with a processing device such as a CPU, a GPU, or an NPU. The cache memory 112 may provide the cache space for the processor 111. The cache memory 112 may communicate with the main memory device 120 and the swap memory device 130. The communication between the cache memory 112 and the swap memory device 130 may use the MM I/O interface.

The main memory device 120 may communicate with the host device 110, the swap memory device 130, and the storage device 140. The communication between the main memory device 120 and the swap memory device 130 may use the block I/O interface.

The swap memory device 130 may communicate with the host device 110, the main memory device 120, and the storage device 140. The swap memory device 130 may provide the swap space for the main memory device 120.

When the power is supplied to the electronic device 100 (i.e., the electronic device 100 performs the booting operation), under control of the host device 110, the swap memory device 130 may receive the plurality of data blocks BLK1 to BLKN from the storage device 140 and may store the plurality of data block BLK1 to BLKN in the swap space. Depending on the processing by the processor 111, the host device 110 may update the plurality of data blocks BLK1 to BLKN present in the swap memory device 130. For example, the host device 110 may update (e.g., add, delete, and change) data blocks of the swap space periodically or non-periodically such that data blocks with a high probability of use are maintained in the swap space.

The swap space may store the plurality of data blocks BLK1 to BLKN. Each of the plurality of data blocks BLK1 to BLKN may include a plurality of data. Herein, "N" is an arbitrary natural number. For example, the first data block BLK1 may include the plurality of data DT1 to DTK. Herein, "K" is an arbitrary natural number. The first data DT1 among the plurality of data DT1 to DTK may be target data that are used in the processing by the processor 111.

The storage device 140 may communicate with the host device 110, the main memory device 120, and the swap memory device 130. Under control of the host device 110, the storage device 140 may provide the main memory device 120 and the swap memory device 130 with a data block of the block unit.

Below, a data transfer of the electronic device 100 according to embodiments of the present disclosure will be described.

The processor 111 may attempt to process the first data DT1. The first data DT1 may be absent from the main memory device 120. The processor 111 may fail in the processing of the first data DT1 that are not loaded to the main memory device 120. When the first data DT1 are absent from the main memory device 120, the processor 111 may determine that the page fault for the first data DT1 occurs.

The processor 111 may provide the request corresponding to the first data DT1 to the swap memory device 130.

The swap memory device 130 may provide the main memory device with the first data DT1 of the first data block BLK1 in the swap space, based on the request. Because the swap memory device 130 supports the MM I/O interface with the host device 110, the swap memory device 130 may provide the first data DT1 of the byte unit to the cache memory 112 of the host device 110 without providing the remaining data DT2 to DTK to the host device 110.

Also, based on the request, the swap memory device 130 may provide the first data block BLK1 to the main memory device 120 in a background operation for the transfer of the first data DT1 (i.e., while the first data DT1 are transferred to the host device 110). The first data block BLK1 provided to the main memory device 120 may have a high probability of use in the next processing by the processor 111. For example, in terms of the temporal locality or the spatial locality, the plurality of data DT1 to DTK of the first data block BLK1 may have a high probability of use in the next processing by the processor 111. As the swap memory device 130 provides the first data block BLK1 to the main memory device 120 in the background operation, the probability of occurrence of a page fault in the next processing may decrease. The operation in which the swap memory device 130 provides the first data block BLK1 to the main memory device 120 may be referred to as a "swap operation".

After the transfer of the first data DT1 from the swap memory device 130 to the cache memory 112 is completed, the processor 111 may again perform the processing of the first data DT1 loaded to the cache memory 112.

In this case, the re-execution for the processing of the first data DT1 may be performed regardless of whether the transfer of the first data block BLK1 from the swap memory device 130 to the main memory device 120 is completed. The swap latency corresponding to the swap operation may not affect the latency for the re-execution of the processor 111. In other words, the throughput of the processor 111 may be improved by the swap latency hiding. The swap latency hiding will be described in detail with reference to FIG. 4.

Figure 4:
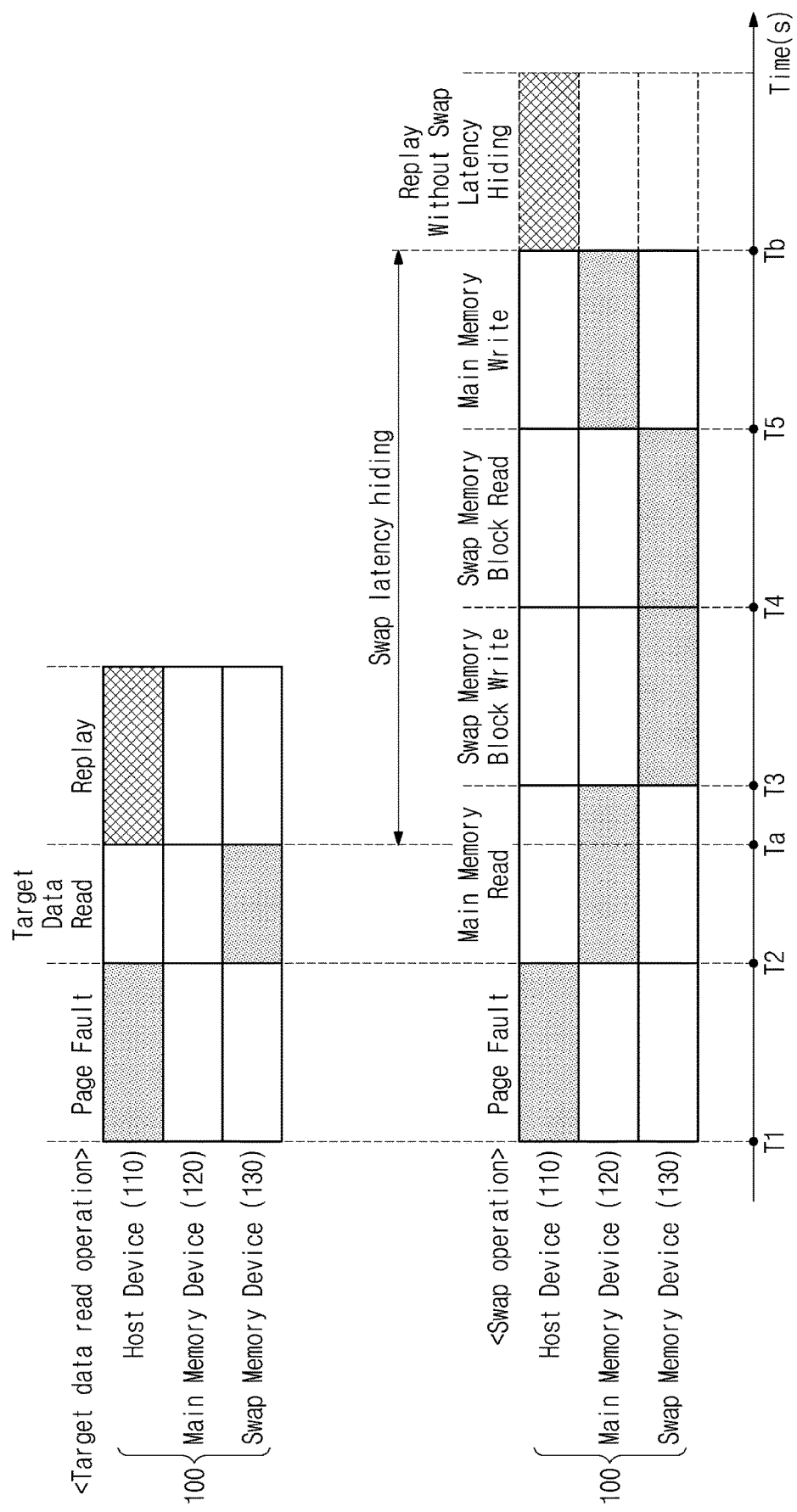
FIG. 4 is a graph describing a swap latency of the electronic device of FIG. 3.

FIG. 4 is a graph describing a swap latency of an electronic device of FIG. 3. Referring to FIG. 4, the electronic device 100 may include the host device 110, the main memory device 120, and the swap memory device 130. The electronic device 100 may perform the target data read operation and the swap operation. In FIG. 4, a horizontal axis represents time.

The target data read operation may indicate an operation in which target data are provided from the swap memory device 130 to the host device 110. The swap operation may indicate an operation in which a target data block including the target data are provided from swap memory device 130 to the main memory device 120. The swap operation may be performed as a background operation associated with the target data read operation.

Referring to the graph of the target data read operation, the electronic device 100 of FIG. 3 may detect the page fault in the time period from T1 to T2. For example, in response to the target data not being loaded to the main memory device 120, the host device 110 may determine that the page fault for the target data occurs.

In the time period from T2 to Ta, the electronic device 100 may perform the target data read operation. For example, the swap memory device 130 may provide the target data to the host device 110 through the MM I/O interface. In this case, because the size of the target data is relatively small compared to the size of the target data block, a time taken to transfer the target data may be shorter than a time taken to transfer the target data block.

After the point in time Ta, the electronic device 100 may perform the replay operation on the target data. The replay operation may indicate an operation in which processing is again performed on the target data corresponding to the page fault. For example, the host device 110 may perform the replay operation based on the target data directly received from the swap memory device 130.

Referring to the graph of the swap operation, the electronic device 100 may detect the page fault in the time period from T1 to T2. The operation in which the page fault is detected in the swap operation may be identical to or similar to the operation in which the page fault is detected in the target data read operation.

In the time period from T2 to T3, the electronic device 100 may perform the main memory read operation. For example, to secure a space to load the target data block including the target data, the main memory device 120 may determine a data block to be provided from the main memory device 120 to the swap memory device 130 (e.g., a data block not including the target data).

In the time period from T3 to T4, the electronic device 100 may perform the swap memory block write operation. For example, the swap memory device 130 may receive a data block corresponding to the main memory read operation from the main memory device 120. After backing up the data block to the swap memory device 130, the main memory device 120 may secure the storage space corresponding to the backed-up data block.

In the time period from T4 to T5, the electronic device 100 may perform the swap memory block read operation. For example, the swap memory device 130 may provide the target data block including the target data to the main memory device 120 through the block I/O interface.

In the time period from T5 to Tb, the electronic device 100 may perform the main memory write operation. For example, the main memory device 120 may maintain a state of loading the target data block including the target data (e.g., may buffer the target data block). The host device 110 may access the plurality of data, which correspond to the target data block loaded to the main memory device 120, in the byte unit.

The operation shown after the point in time Tb indicates the replay operation in some embodiments to which the swap latency hiding is not applied. For example, in the case where the host device 110 does not perform the target data read operation, the host device 110 may access the target data loaded to the main memory device 120 after the point in time Tb. When the electronic device 100 does not support the MM I/O interface between the swap memory device 130 and the host device 110, the host device 110 may be capable of again performing the processing for the target data corresponding to the page fault after the point in time Tb.

Accordingly, the swap latency corresponding to the time period from Ta to Tb may be hidden by the processing of the host device 110 on the target data (i.e., by the replay operation). The swap latency hiding technique may be implemented by transferring the target data from the swap memory device 130 to the host device 110 in parallel with the transfer of the target data block from the swap memory device 130 to the main memory device 120.

Figure 5:
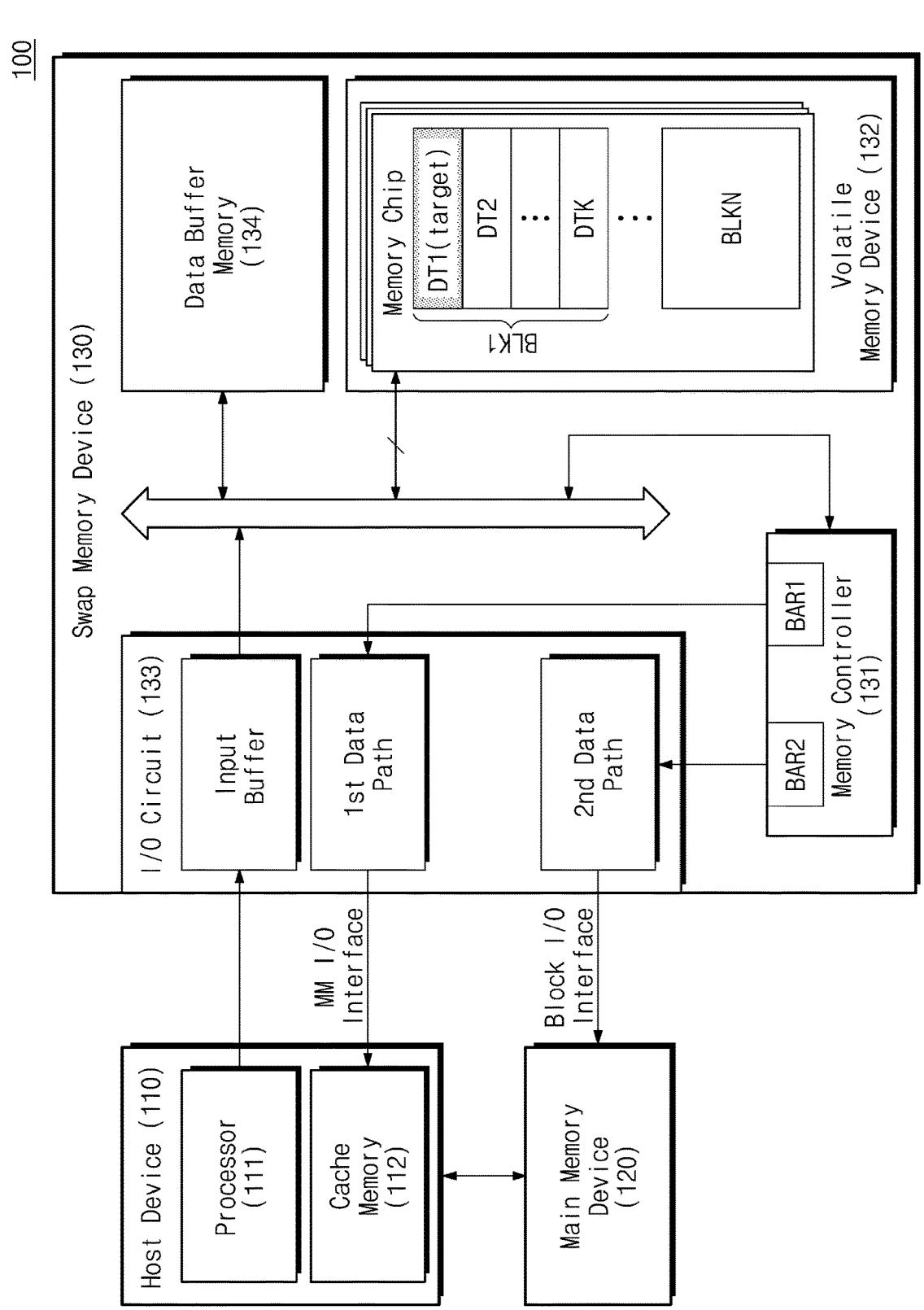
FIG. 5 is a block diagram describing an electronic device according to some embodiments of the present disclosure.

FIG. 5 is a block diagram describing an electronic device according to some embodiments of the present disclosure. Referring to FIG. 5, the electronic device 100 may include the host device 110, the main memory device 120, and the swap memory device 130.

The host device 110 may communicate with the main memory device 120 and the swap memory device 130. The host device 110 may include the processor 111 and the cache memory 112. The processor 111 may determine whether the page fault of the target data occurs, based on the communication with the main memory device 120. For example, when data necessary in the read operation are not loaded to the main memory device 120 or when a space to store data generated as the processing result is absent from the main memory device 120, the processor 111 may determine that the page fault occurs.

In response to determining that the page fault of the target data occurs, the processor 111 may provide the request corresponding to the target data to the swap memory device 130.

The main memory device 120 may communicate with the host device 110 and the swap memory device 130. The hierarchy of the main memory device 120 may be higher than the hierarchy of the swap memory device 130.

The swap memory device 130 may communicate with the host device 110 and the main memory device 120. The swap memory device 130 may include the memory controller 131, the volatile memory device 132, the I/O circuit 133, and a data buffer memory 134. The memory controller 131, the volatile memory device 132, the I/O circuit 133, and a data buffer memory 134 may be interconnected through the bus.

The memory controller 131 may control an overall operation of the swap memory device 130. The memory controller 131 may include a first base address register BAR1 and a second base address register BAR2.

The first base address register BAR1 may be used to access the target data of the byte unit. For example, the first base address register BAR1 may store parameters (including an offset and an index) that are used in the MM I/O interface for address management of the byte unit.

The second base address register BAR2 may be used to access the target data block of the block unit. For example, the second base address register BAR2 may store parameters that are used in the block I/O interface for address management of the block unit.

The volatile memory device 132 may include a plurality of memory chips. For example, each of the plurality of memory chips may be a DRAM chip. The plurality of memory chips may be referred to a "network-of-DRAM (NoD)". Each of the plurality of memory chips may store the plurality of data blocks BLK1 to BLKN. Each of the plurality of data blocks BLK1 to BLKN may include a plurality of data. For example, the first data block BLK1 may include the plurality of data DT1 to DTK. The first data DT1 may be the target data.

The I/O circuit 133 may include an input buffer, a first data path, and a second data path. The input buffer may receive the request from the processor 111 of the host device 110. The request received through the input buffer may be provided to the memory controller 131. The first data path may be used to transfer the target data of the byte unit through the MM I/O interface. The first data path may correspond to the first base address register BAR1. The second data path may be used to transfer the target data block of the block unit through the block I/O interface. The second data path may correspond to the second base address register BAR2.

The data buffer memory 134 may function as a buffer between the volatile memory device 132 and the I/O circuit 133. Under control of the memory controller 131, the data buffer memory 134 may provide the target data of the loaded target data block to the host device 110 through the first data path of the I/O circuit 133 in the byte unit. Under control of the memory controller 131, the data buffer memory 134 may provide the loaded target data block to the main memory device 120 through the second data path of the I/O circuit 133 in the block unit.

In some embodiments, the data buffer memory 134 may be managed by a prediction operation of the memory controller 131. For example, before the first data DT1 is called from the host device 110, the memory controller 131 may predict that the first data block BLK1 including the first data DT1 will be called. Before receiving the request for calling the first data DT1 from the host device 110, the memory controller 131 may load the first data block BLK1 including the first data DT1, which are predicted to be called, from the volatile memory device 132 to the data buffer memory 134. Unlike the above description, in the case of failing to predict that the first data block BLK1 will be called (i.e., when the prediction fails), in terms of follow-up, the memory controller 131 may load the first data block BLK1 of the volatile memory device 132 to the data buffer memory 134, based on the request received from the host device 110.

Figure 6:
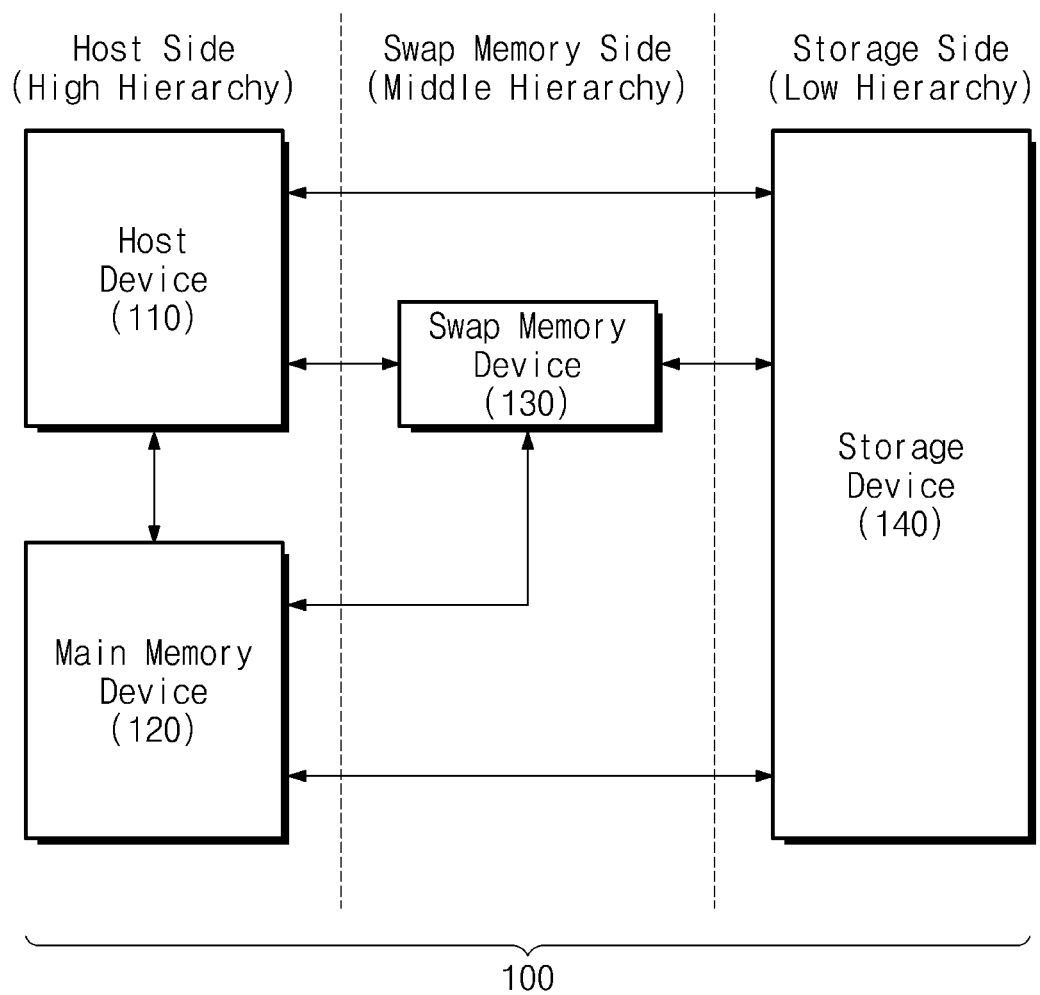
FIG. 6 is a diagram describing a hierarchy structure of an electronic device according to some embodiments of the present disclosure.

FIG. 6 is a diagram describing a hierarchy structure of an electronic device according to some embodiments of the present disclosure. The hierarchy structure of the electronic device 100 according to some embodiments of the present disclosure will be described with reference to FIG. 6. The electronic device 100 may include the host device 110, the main memory device 120, the swap memory device 130, and the storage device 140.

A host side may include the host device 110 and the main memory device 120. The host side may be referred to as a "high hierarchy".

A swap memory side may include the swap memory device 130. The swap memory side may be referred to as a "middle hierarchy".

A storage side may include the storage device 140. The storage side may be referred to as a "low hierarchy".

As the hierarchy becomes higher, an I/O speed of data may become faster. As the hierarchy becomes lower, a storage capacity may become larger, and costs may become more inexpensive.

According to the present disclosure, by utilizing the swap memory device 130 having the middle hierarchy between the host side and the storage side, it may be possible to replace an insufficient storage space of the main memory device 120 and to provide the host device 110 with a byte unit-based access.

Figure 7:
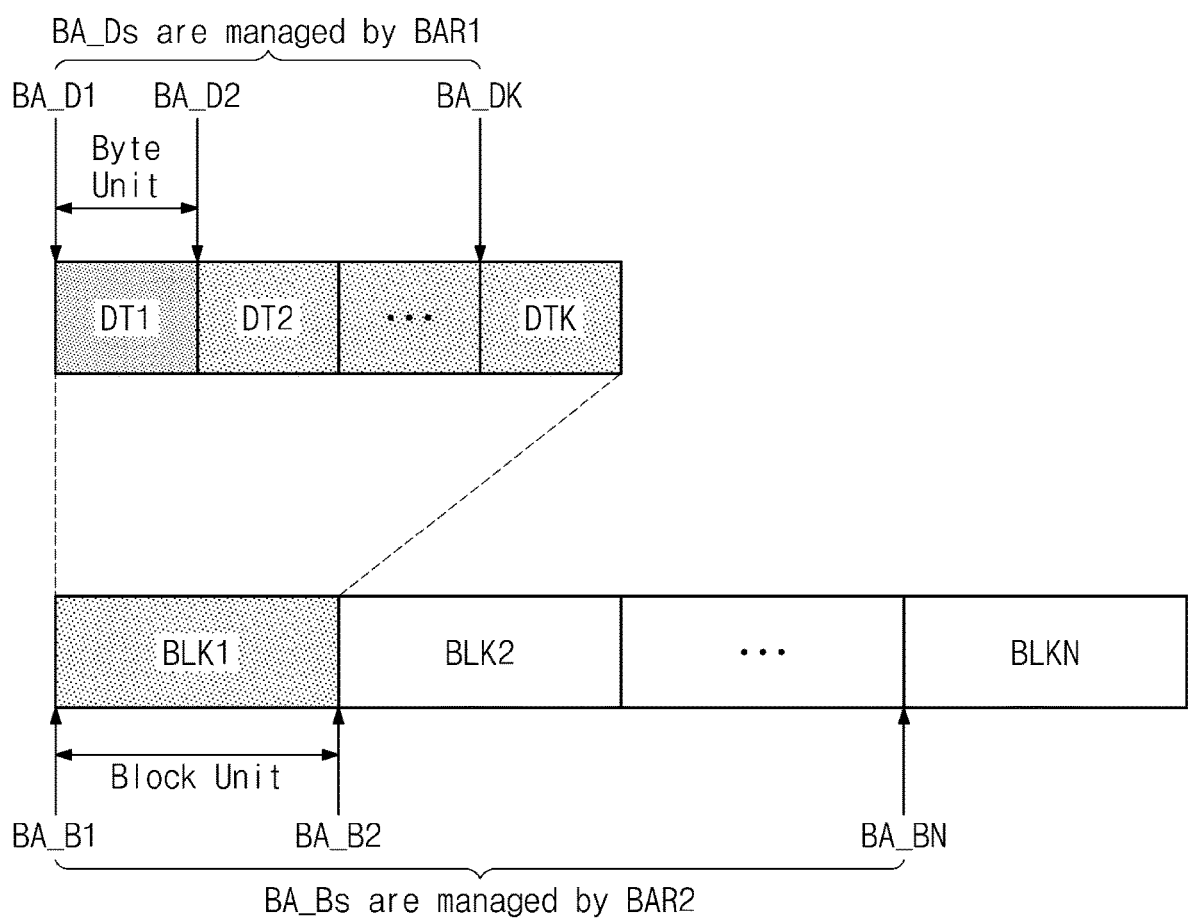
FIG. 7 is a diagram describing a data address and a block address according to some embodiments of the present disclosure.

FIG. 7 is a diagram describing a data address and a block address according to some embodiments of the present disclosure. Referring to FIGS. 5 and 7, the first base address register BAR1 may manage data addresses BA_D of the byte unit. The second base address register BAR2 may manage block addresses BA_B of the block unit.

The volatile memory device 132 may store the plurality of data blocks BLK1 to BLKN. Locations of the plurality of data blocks BLK1 to BLKN may be indicated by the plurality of block addresses BA_B1 to BA_BN. The second base address register BAR2 of the memory controller 131 may manage the plurality of block addresses BA_B1 to BA_BN.

For example, the memory controller 131 may receive the request corresponding to the first data DT1 from the host device 110, may check that the first data block BLK1 is loaded to the data buffer memory 134, and may determine the first block address BA_B1 by using the second base address register BAR2. The memory controller 131 may provide the first data block BLK1 loaded to the data buffer memory 134 to the main memory device 120 in the block unit, based on the first block address BA_B1.

The first data block BLK1 may include the plurality of data DT1 to DTK. Locations of the plurality of data DT1 to DTK may be indicated by the plurality of data addresses BA_D1 to BA_DK. The first base address register BAR1 of the memory controller 131 may manage the plurality of data addresses BA_D1 to BA_DK.

For example, the memory controller 131 may receive the request corresponding to the first data DT1 from the host device 110, may check that the first data block BLK1 including the first data DT1 is loaded to the data buffer memory 134, and may determine the first data address BA_D1 by using the first base address register BAR1. The memory controller 131 may provide the first data DT1 loaded to the data buffer memory 134 to the host device 110 in the byte unit, based on the first data address BA_D1.

Figure 8:
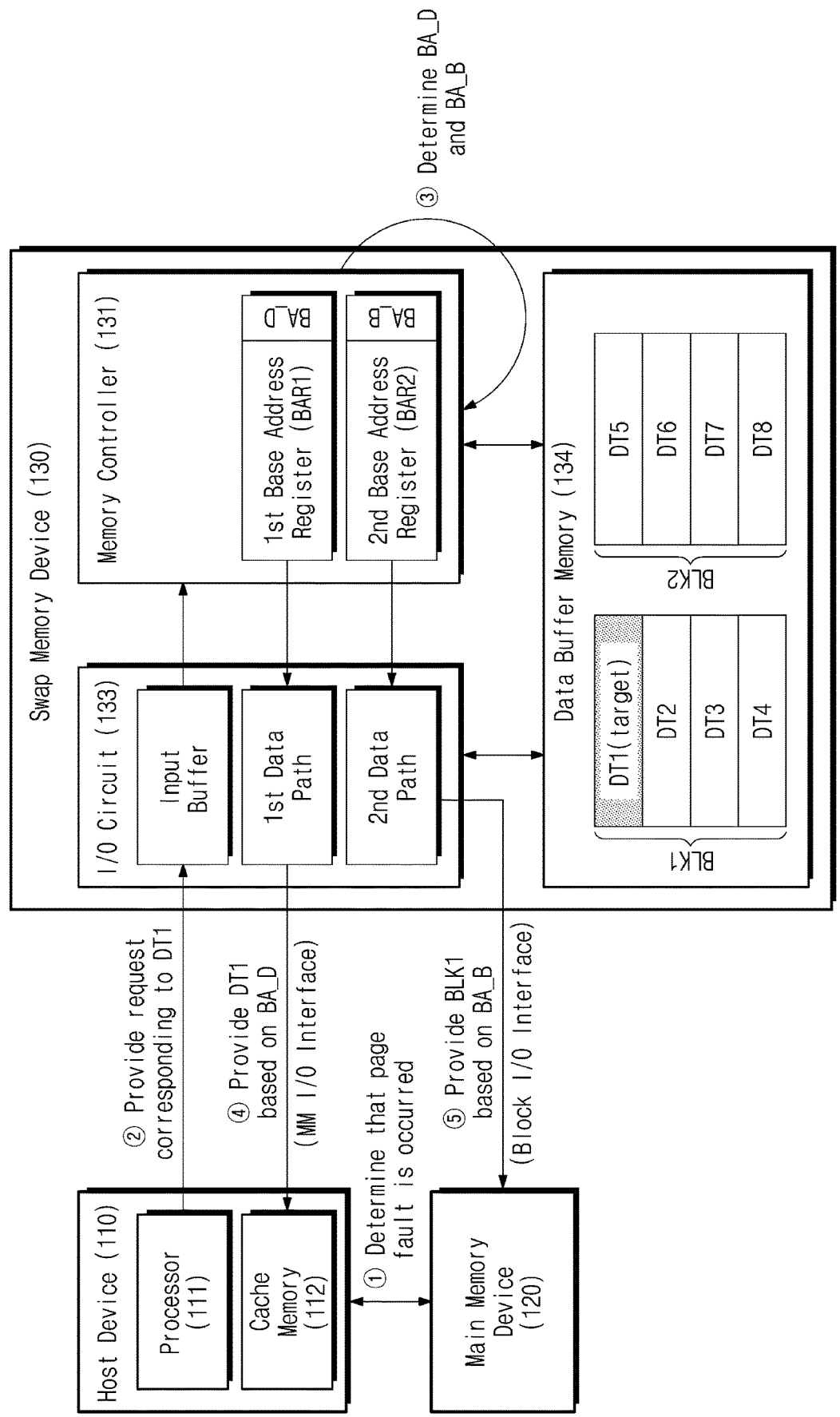
FIG. 8 is a diagram describing a method of operating an electronic device according to some embodiments of the present disclosure.

FIG. 8 is a diagram describing a method of operating an electronic device according to some embodiments of the present disclosure. Referring to FIG. 8, the electronic device 100 may include the host device 110, the main memory device 120, and the swap memory device 130.

The host device 110 may include the processor 111 and the cache memory 112. The swap memory device 130 may include the memory controller 131, the I/O circuit 133, and the data buffer memory 134. The memory controller 131 may include the first base address register BAR1 and the second base address register BAR2. The I/O circuit 133 may include an input buffer, a first data path, and a second data path.

The data buffer memory 134 may include the first data block BLK1 and the second data block BLK2, as well as other data blocks. The first data block BLK1 may include first to fourth data DT1, DT2, DT3, and DT4. The second data block BLK2 may include fifth to eighth data DT5, DT6, DT7, and DT8. The first data DT1 may be referred to as "target data". The first data block BLK1 may be referred to as a "target data block".

Below, a method of operating the electronic device 100 according to embodiments of the present disclosure will be described.

In a first operation ①, the host device 110 may determine that the page fault occurs, based on the communication with the main memory device 120. For example, when target data are absent from the main memory device 120 in the read operation or when a space to store target data generated as the processing result is not secured in the write operation, the host device 110 may determine that the page fault corresponding to the target data occurs. For example, the target data may be the first data DT1.

In a second operation ②, the processor 111 may provide request corresponding to the first data DT1 to the input buffer. The input buffer may provide the request corresponding to the first data DT1 to the memory controller 131.

In a third operation ③, the memory controller 131 may determine the data address BA_D of the target data and the block address BA_B of the target data block based on the request in the second operation ②. For example, the memory controller 131 may determine the data address BA_D indicating the location of the first data DT1 by using the first base address register BAR1. The memory controller 131 may determine the block address BA_B indicating the location of the first data block BLK1 by using the second base address register BAR2.

In a fourth operation ④, under control of the memory controller 131, the first data path of the I/O circuit 133 may provide the first data DT1 loaded from the data buffer memory 134 to the cache memory 112 of the host device 110, based on the data address BA_D. The first data DT1 may be transferred through the MM I/O interface in the byte unit.

In a fifth operation ⑤, under control of the memory controller 131, the second data path of the I/O circuit 133 may provide the first data block BLK1 loaded from the data buffer memory 134 to the main memory device 120, based on the block address BA_B. The first data block BLK1 may be transferred through the block I/O interface in the block unit.

Figure 9:
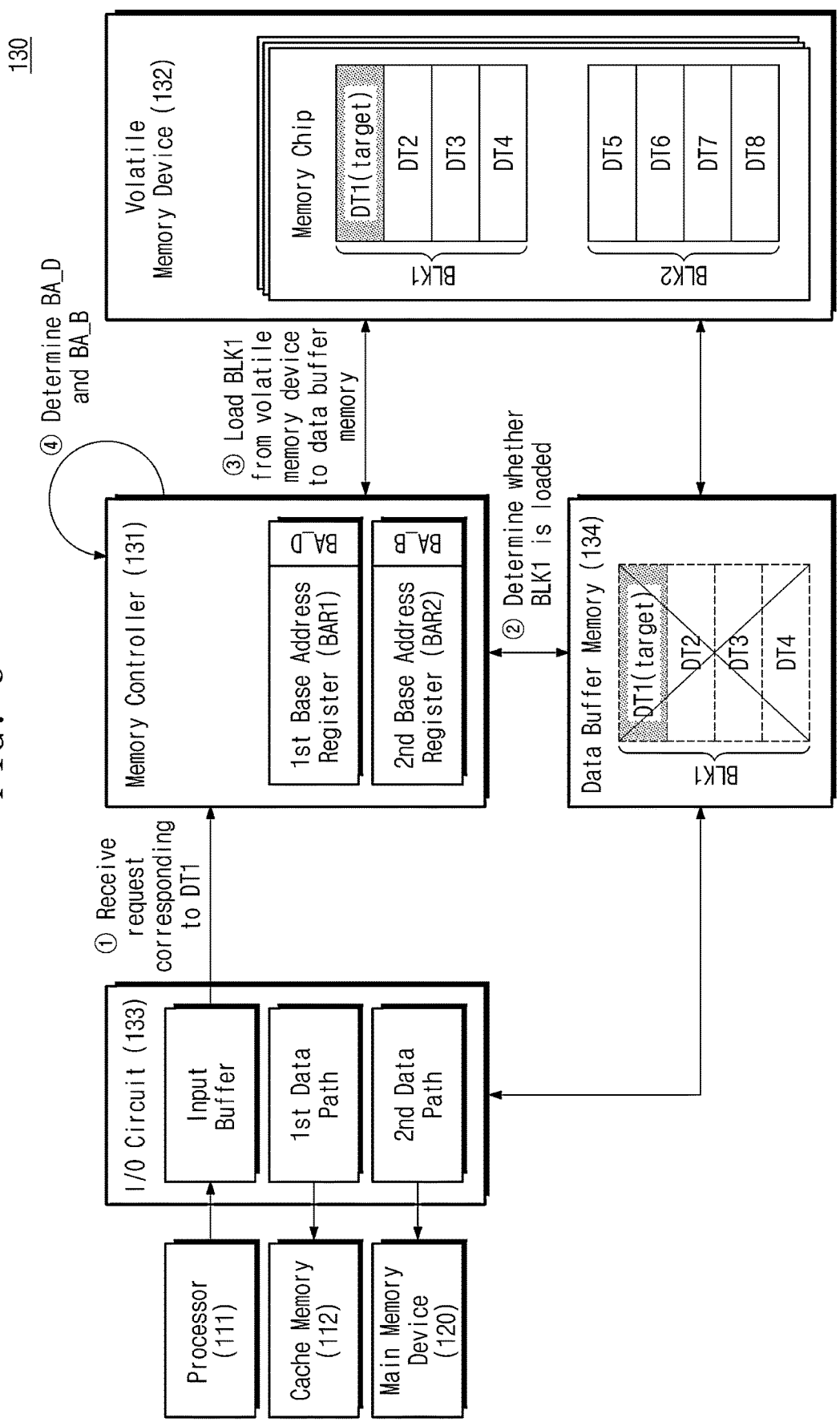
FIG. 9 is a flowchart describing a method of operating a swap memory device according to some embodiments of the present disclosure.

FIG. 9 is a flowchart describing a method of operating a swap memory device according to some embodiments of the present disclosure. Referring to FIG. 9, the swap memory device 130 may communicate with the processor 111, the cache memory 112, and the main memory device 120, as shown for example, in FIG. 8. The swap memory device 130 may include the memory controller 131, the volatile memory device 132, the I/O circuit 133, and the data buffer memory 134.

The memory controller 131 may include the first base address register BAR1 and the second base address register BAR2. The volatile memory device 132 may include a plurality of memory chips. One of the plurality of memory chips may include the first data block BLK1 and the second data block BLK2. The first data block BLK1 may include the first to fourth data DT1, DT2, DT3, and DT4. The second data block BLK2 may include the fifth to eighth data DT5, DT6, DT7, and DT8. The first data DT1 may be referred to as "target data". The first data block BLK1 may be referred to as a "target data block". The I/O circuit 133 may include an input buffer, a first data path, and a second data path.

Below, a method of operating the electronic device 100 according to embodiments of the present disclosure will be described. Operations to be described with reference to FIG. 9 may correspond to the third operation ③ of FIG. 8.

In a first operation ①, the memory controller 131 may receive the request corresponding to the first data DT1 from the processor 111 through the input buffer. The first data DT1 may be the target data corresponding to the page fault.

In a second operation ②, the memory controller 131 may determine whether the first data block BLK1 is loaded to the data buffer memory 134. Unlike the example illustrated in FIG. 9, when the first data block BLK1 is present in the data buffer memory 134, the memory controller 131 may determine the data address BA_D of the target data and the block address BA_B of the target data block. As illustrated in FIG. 9, when the first data block BLK1 is absent from the data buffer memory 134 (i.e., when the prediction fails), the memory controller 131 may selectively perform a third operation ③.

In the third operation ③, the memory controller 131 may load the first data block BLK1 to the data buffer memory 134 from the volatile memory device 132. The data buffer memory 134 may store (e.g., buffer) the first data block BLK1 received from the volatile memory device 132.

In a fourth operation ④, the memory controller 131 may determine the data address BA_D of the target data and the block address BA_B of the target data block. For example, the memory controller 131 may determine the data address BA_D indicating the location of the first data DT1 by using the first base address register BAR1. The memory controller 131 may determine the block address BA_B indicating the location of the first data block BLK1 by using the second base address register BAR2.

Figure 10:
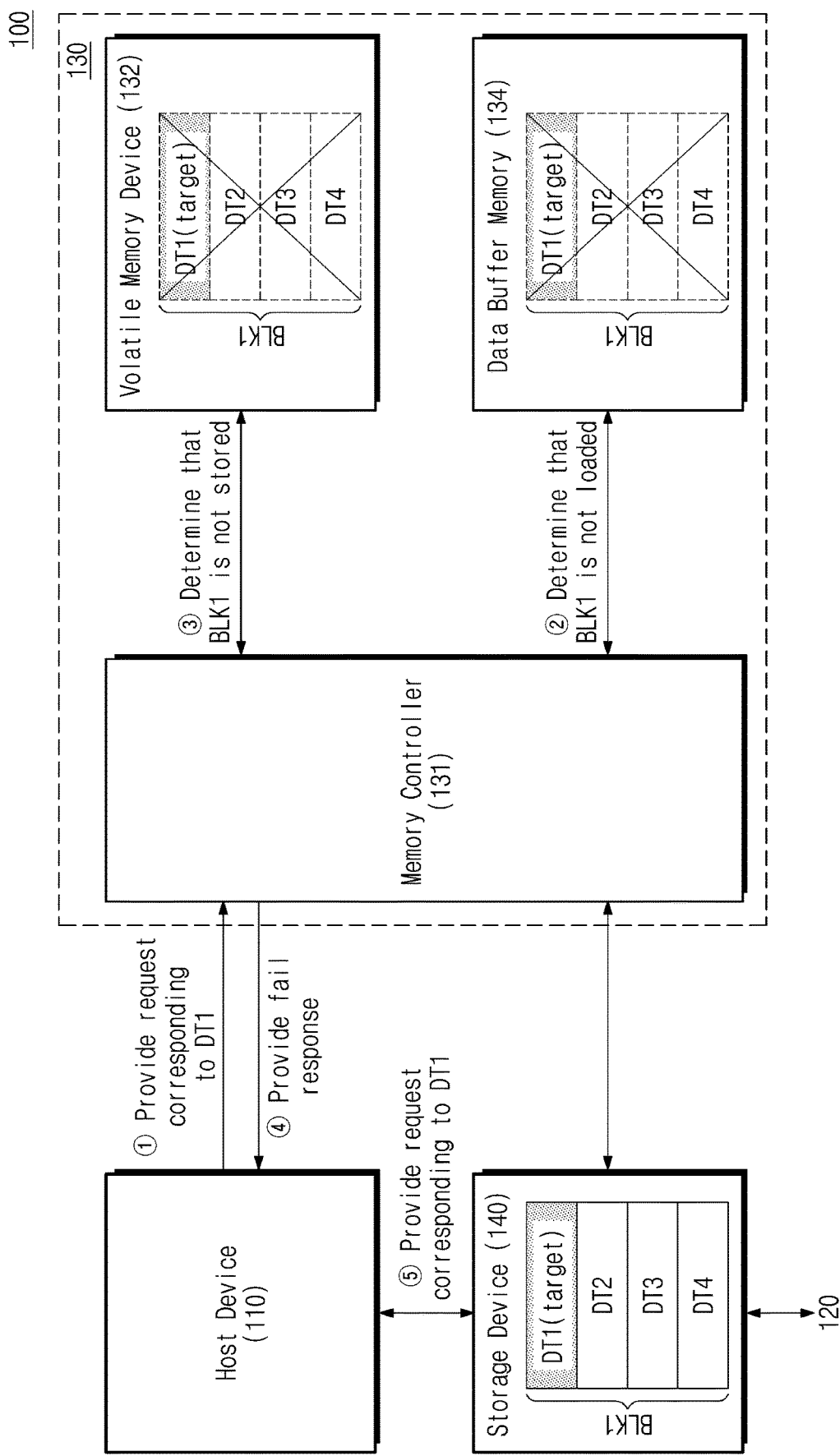
FIG. 10 is a diagram describing a method of operating an electronic device according to some embodiments of the present disclosure.

FIG. 10 is a diagram describing a method of operating an electronic device according to some embodiments of the present disclosure. Referring to FIG. 10, the electronic device 100 may include the host device 110, the main memory device 120, the swap memory device 130, and the storage device 140. The swap memory device 130 may include the memory controller 131, the volatile memory device 132, and the data buffer memory 134. The first data block BLK1 may include the first to fourth data DT1, DT2, DT3, and DT4. The first data DT1 may be referred to as "target data". The first data block BLK1 may be referred to as a "target data block".

Below, a method of operating the electronic device 100 according to embodiments of the present disclosure will be described. Operations to be described with reference to FIG. 10 may correspond to the case where the third operation ③ of FIG. 9 fails.

In a first operation ①, the host device 110 may provide the request corresponding to the first data DT1 to the swap memory device 130. The first data DT1 may be the target data corresponding to the page fault.

In a second operation ②, the memory controller 131 may determine that the first data block BLK1 is not loaded to (or is absent from) the data buffer memory 134, based on the communication with the data buffer memory 134.

In a third operation ③, the memory controller 131 may determine that the first data block BLK1 is not stored in (or is absent from) the volatile memory device 132, based on the communication with the volatile memory device 132. That is, the page fault of the first data DT1 may occur in the swap memory device 130.

In a fourth operation ④, the memory controller 131 may provide a fail response to the host device 110. The fail response may indicate that the request in the first operation ① fails.

In a fifth operation ⑤, the host device 110 may provide the request corresponding to the first data DT1 to the storage device 140. The storage device 140 may provide the main memory device 120 or the swap memory device 130 with the first data block BLK1, based on the request from the host device 110. After the transfer of the first data block BLK1 is completed, the storage device 140 may provide the host device 110 with a done response indicating that the request corresponding to the first data block BLK1 is processed.

Figure 11:
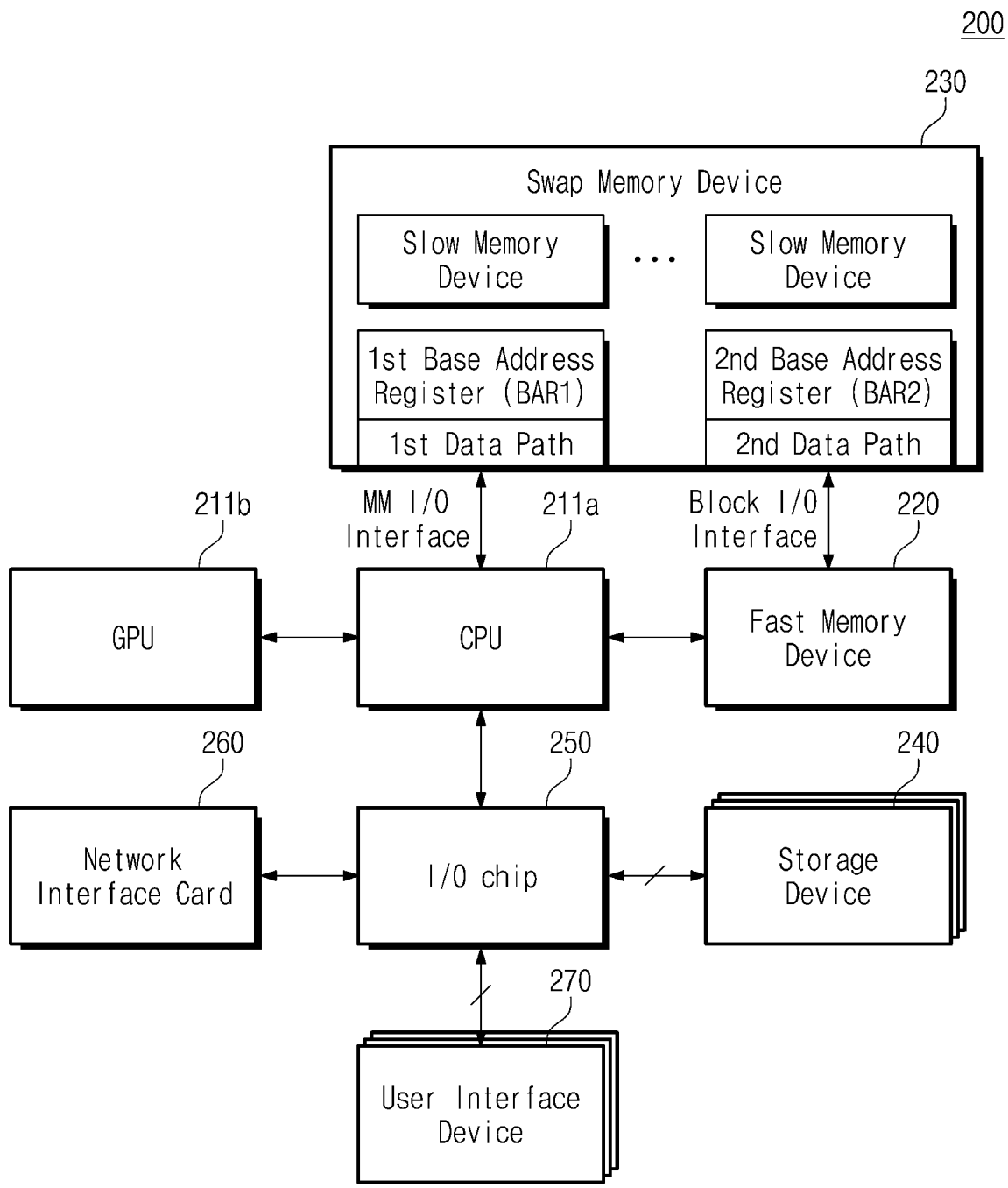
FIG. 11 is a block diagram of an electronic device according to some embodiments of the present disclosure.

FIG. 11 is a block diagram of an electronic device according to some embodiments of the present disclosure. Referring to FIG. 11, an electronic device 200 may include a CPU 211a, a GPU 211b, a fast memory device 220, a swap memory device 230, storage devices 240, an I/O chip 250, a network interface card 260, and user interface devices 270.

The CPU 211a and the GPU 211b may correspond to the host device 110 of FIG. 1. The fast memory device 220 may correspond to the main memory device 120 of FIG. 1. The swap memory device 230 may correspond to the swap memory device 130 of FIG. 1. The storage devices 240 may correspond to the storage device 140 of FIG. 1.

The swap memory device 230 may include the first data path, the second data path, the first base address register BAR1, the second base address register BAR2, and a plurality of slow memory devices. One of the slow memory devices may store the target data block. The target data block may include the target data. The first base address register BAR1 may determine a data address that is used to transfer the target data of the byte unit. The second base address register BAR2 may determine a block address that is used to transfer the target data block of the block unit.

The swap memory device 230 may transfer the target data to the CPU 211a through the first data path using the MM I/O interface, based on the data address. The swap memory device 230 may transfer the target data block to the fast memory device 220 through the second data path using the block I/O interface, based on the block address.

The CPU 211a and the GPU 211b may communicate through the graphics interface embedded in the PCIe (Peripheral Component Interconnect express) interface.

The I/O chip 250 may support the interconnection between the CPU 211a, the network interface card 260, the storage devices 240, and the user interface devices 270. The I/O chip 250 may connect the CPU 211a and the swap memory device 230 such that the MM I/O interface is supported between the CPU 211a and the swap memory device 230. The I/O chip 250 may connect the fast memory device 220 and the swap memory device 230 such that the block I/O interface is supported between the fast memory device 220 and the swap memory device 230.

The network interface card 260 may provide a network environment for communication between the electronic device 200 and an external electronic device (not illustrated). For example, the network interface card 260 may support various network environments such as a local area network, a wide area network, a cellular network, and an Internet.

The user interface devices 270 may provide an interface between the electronic device 200 and the user. For example, the user interface devices 270 may be implemented with a monitor, a touchscreen, a mouse, a speaker, and/or an audio device.

Figure 12:
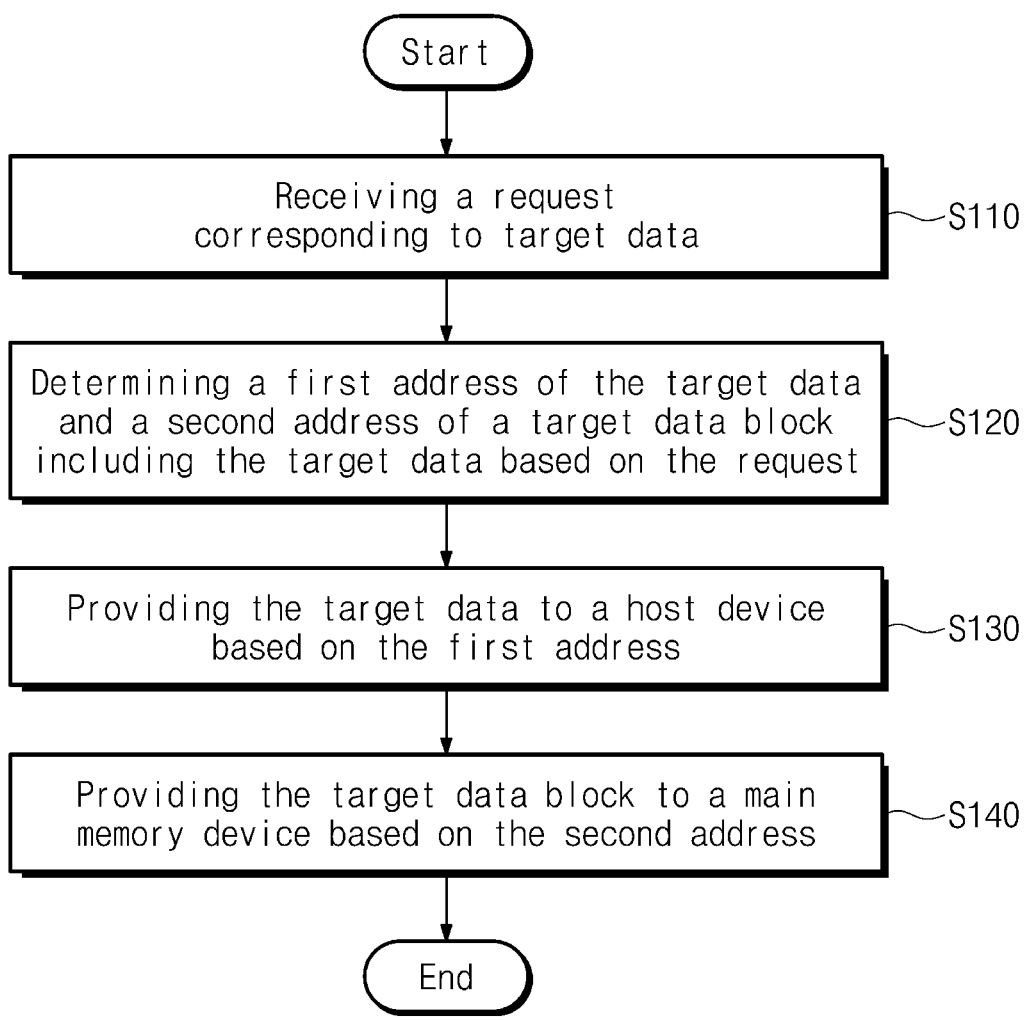
FIG. 12 is a flowchart describing a method of operating a swap memory device according to some embodiments of the present disclosure.

FIG. 12 is a flowchart describing a method of operating a swap memory device according to some embodiments of the present disclosure. A method of operating a swap memory device will be described with reference to FIG. 12. The swap memory device may correspond to the swap memory device 130 described with reference to FIGS. 1, 3, 5, 6, 8, 9, and/or 10 or may correspond to the swap memory device 230 described with reference to FIG. 11. The swap memory device may communicate with a host device and a main memory device.

In operation S110, the swap memory device may receive a request corresponding to target data from the host device. The target data may correspond to a page fault in the host device.

In operation S120, the swap memory device may determine a first address of the target data and a second address of a target data block including the target data, based on the request in operation S110. For example, the first address may be a data address that is used for an access of the byte unit. The second address may be a block address that is used for an access of the block unit.

In operation S130, the swap memory device may provide the target data to the host device based on the first address. For example, the swap memory device may transfer the target data to the host device in the byte unit by using the MM I/O interface.

In operation S140, the swap memory device may provide the target data block to the main memory device based on the second address. For example, the swap memory device may provide the target data block to the main memory device by using the block I/O interface.

In some embodiments, operation S130 and operation S140 may be performed in parallel. For example, before the swap memory device completes the transfer of the target data block to the main memory device, the swap memory device may begin and/or complete the transfer of the target data to the host device. The target data block may be transferred by the background operation. In other words, the swap memory device may provide the target data and the target data block in parallel. While the host device performs the replay operation on the target data, the target data block may be transferred from the swap memory device to the main memory device. As the swap latency is hidden, the processing speed of the host device may become faster.

Figure 13:
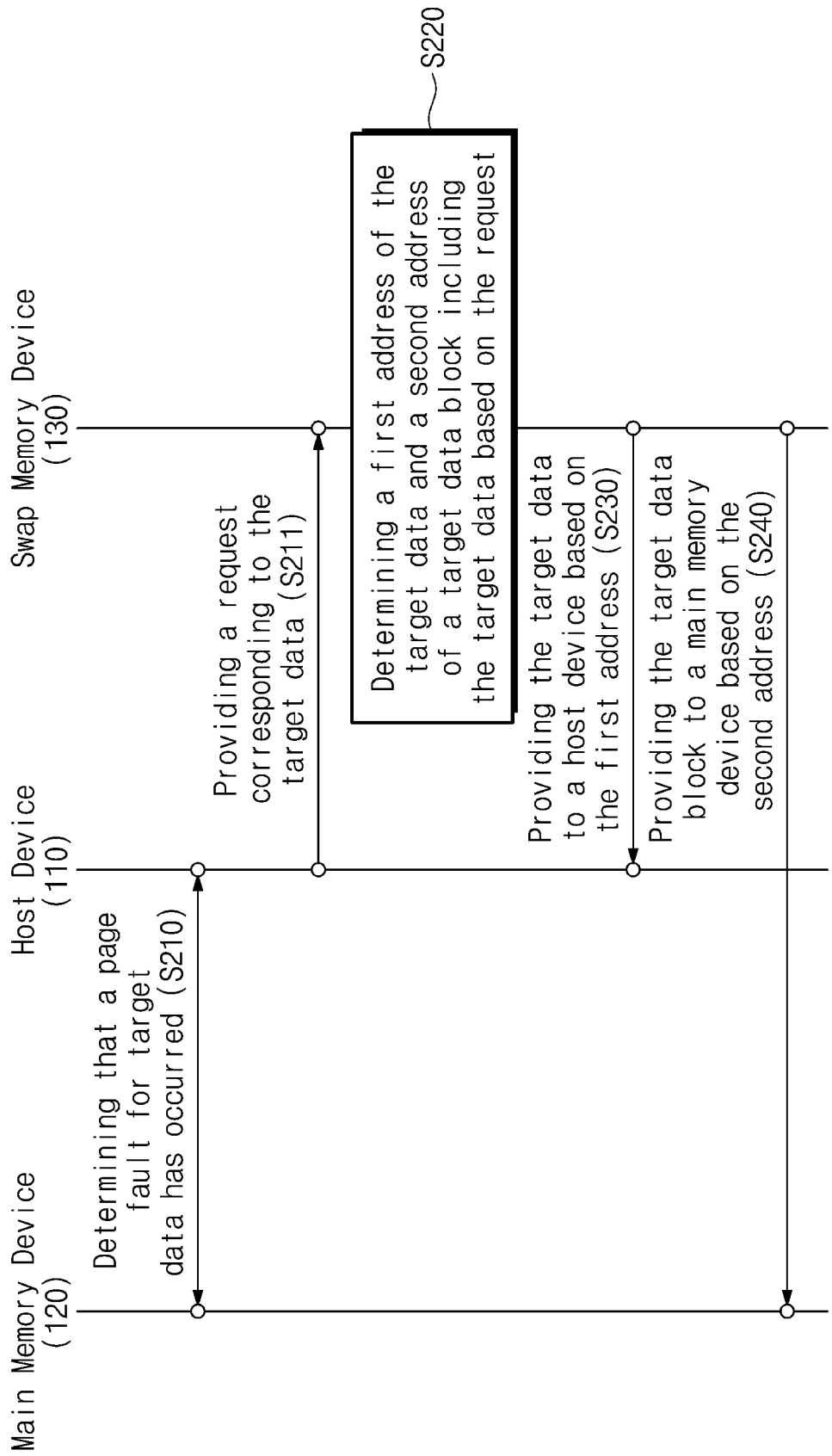
FIG. 13 is a flowchart describing a method of operating an electronic device according to some embodiments of the present disclosure.

FIG. 13 is a flowchart describing a method of operating an electronic device according to some embodiments of the present disclosure. A method of operating an electronic device will be described with reference to FIG. 13. The electronic device may correspond to the electronic device 100 described with reference to FIGS. 1, 3, 5, 8, and/or 10 or may correspond to the electronic device 200 described with reference to FIG. 11. The electronic device may include the host device 110, the main memory device 120, and the swap memory device 130.

In operation S210, the host device 110 may determine that the page fault of the target data occurs, based on the communication with the main memory device 120. For example, when target data are absent from the main memory device 120 in the read operation of the host device 110 or when a storage space of the main memory device 120 is insufficient in the write operation of the host device 110 for target data generated as the processing result, the host device 110 may determine that the page fault of the target data occurs.

In operation S211, the host device 110 may provide the request corresponding to the target data to the swap memory device 130.

In operation S220, the swap memory device 130 may determine a first address of the target data and a second address of a target data block including the target data, based on the request in operation S211. For example, the first address may be a data address that is used for an access of the byte unit. The second address may be a block address that is used for an access of the block unit.

In operation S230, the swap memory device 130 may provide the target data to the host device 110 based on the first address.

In operation S240, the swap memory device 130 may provide the target data block to the main memory device 120 based on the second address.

Figure 14:
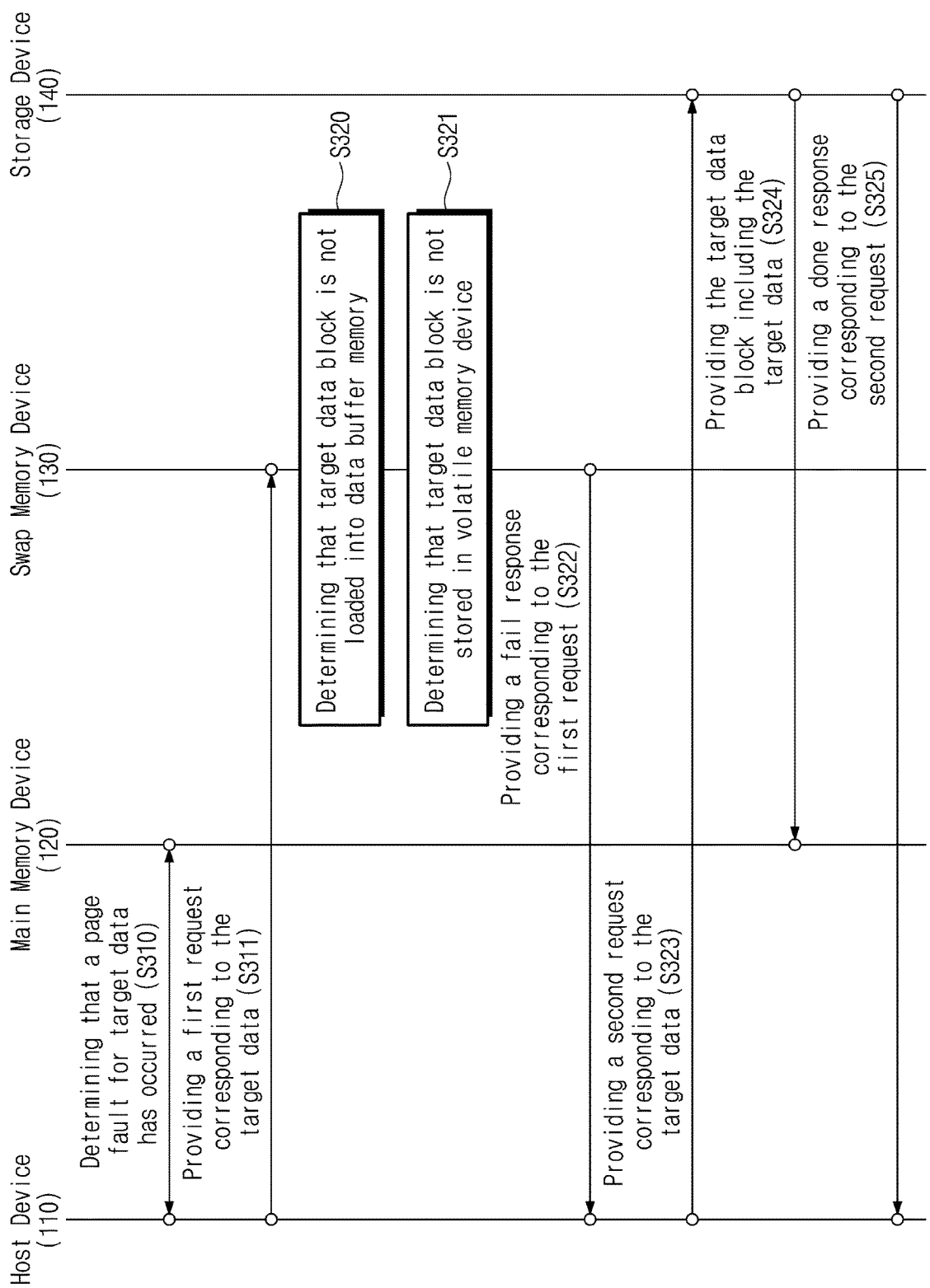
FIG. 14 is a flowchart describing a method of operating an electronic device according to some embodiments of the present disclosure.

FIG. 14 is a flowchart describing a method of operating an electronic device according to some embodiments of the present disclosure. A method of operating an electronic device will be described with reference to FIG. 14. The electronic device may correspond to the electronic device 100 described with reference to FIGS. 1, 3, 5, 8, and/or 10 or may correspond to the electronic device 200 described with reference to FIG. 11. The electronic device may include the host device 110, the main memory device 120, the swap memory device 130, and the storage device 140.

In operation S310, the host device 110 may determine that the page fault of the target data occurs, based on the communication with the main memory device 120.

In operation S311, the host device 110 may provide a first request corresponding to the target data to the swap memory device 130.

In operation S320, the swap memory device 130 may determine that a target data block is not loaded to (or is absent from) a data buffer memory. The target data block may indicate a data block including the target data. For example, the swap memory device 130 may include a volatile memory device and the data buffer memory. The swap memory device 130 may predict that the target data block will be called and may load the target data block to the data buffer memory. When the swap memory device 130 fails in predicting that the target data block will be called (i.e., when the prediction fails), the target data block may not be loaded to the data buffer memory.

In operation S321, the swap memory device 130 may determine that the target data block is not stored in (or is absent from) the volatile memory device. For example, the page fault of the target data may occur in the swap memory device 130.

In operation S322, the swap memory device 130 may provide the fail response corresponding to the first request in operation S311 to the host device 110. The fail response may indicate that the page fault of the target data occurs in the swap memory device 130.

In operation S323, the host device 110 may provide a second request corresponding to the target data to the storage device 140.

In operation S324, the storage device 140 may provide the target data block including the target data to the main memory device 120. In some embodiments, the storage device 140 may provide the target data block including the target data to the swap memory device 130.

In operation S325, the storage device 140 may provide a done response corresponding to the second request to the host device 110. For example, after completing the transfer of the target data block, the storage device 140 may provide the host device 110 with the done response indicating that the second request in operation S323 is processed. The host device 110 may access the target data block loaded to the main memory device 120 based on the done response. In some embodiments, when the storage device 140 provides the target data block to the swap memory device 130, the host device 110 may request the target data from the swap memory device 130 based on the done response.

In some embodiments, the done response in operation S325 is provided from the storage device 140 to the host device 110. The done response in operation S325 may include an identifier indicating a memory device to which the target data block is transferred. For example, when the storage device 140 transfers the target data block to the main memory device 120, the identifier of the done response may have a first value. When the storage device 140 transfers the target data block to the swap memory device 130, the identifier of the done response may have a second value. However, the present disclosure is not limited thereto. For example, the electronic device may include a plurality of main memory devices or a plurality of swap memory devices, and the identifier may be implemented to indicate one of values for distinguishing two or more memory devices.

According to some embodiments of the present disclosure, a swap memory device providing data and a data block, a method of operating the same, and a method of operating an electronic device including the same are provided.

Also, according to some embodiments of the present disclosure, a swap memory device that decreases a latency for re-execution of processing by a processor by directly providing data to a host device in the byte unit and provides a data block to a main memory device in the block unit through a background operation for the purpose of the next processing, a method of operating the same, and a method of operating an electronic device including the same are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a swap memory device configured to communicate with a host device and a main memory device, wherein the swap memory device includes a memory controller, a data buffer memory, and a volatile memory device, the method comprising:
storing a target data block including target data;
receiving, from the host device, a request corresponding to the target data;
determining, by the swap memory device, a first address of the target data and a second address of the target data block that includes the target data, based on the request;
providing, by the swap memory device, the target data to the host device based on the first address; and
providing, by the swap memory device, the target data block to the main memory device based on the second address,
wherein the determining of the first address of the target data and the second address of the target data block that includes the target data based on the request comprises:
determining, by the memory controller, whether the target data block is loaded to the data buffer memory;
in response to determining that the target data block is not loaded to the data buffer memory, loading, by the memory controller, the target data block from the volatile memory device to the data buffer memory; and
determining, by the memory controller, the first address and the second address, after loading the target data block to the data buffer memory.

2. The method of claim 1, wherein the first address is used to transfer the target data in a size of a byte unit size, through a memory mapped input/output interface (MM I/O interface), and
wherein the second address is used to transfer the target data block in a size of a block unit size that is greater than the byte unit size, through a block input/output interface (block I/O interface).

3. The method of claim 1, wherein the swap memory device includes a first base address register and a second base address register,
wherein the determining of the first address of the target data and the second address of the target data block that includes the target data comprises:

determining the first address, which is used to access the target data in a size of a byte unit size, by using the first base address register, based on the request; and determining the second address, which is used to access the target data block in a size of a block unit size, by using the second base address register, based on the request.

4. The method of claim 1, wherein the swap memory device is configured to perform operations comprising:

providing the target data to the host device based on the first address; and providing the target data block to the main memory device based on the second address, wherein the target data and the target data block are provided in parallel operations.

5. The method of claim 1, wherein the method further comprises:

predicting, by the memory controller, that the target data is to be retrieved, before the request is received; and loading, by the memory controller, the target data block including the target data predicted to be called from the volatile memory device to the data buffer memory, before the request is received.

6. The method of claim 1, further comprising:

determining, by the memory controller, the first address and the second address, in response to determining that the target data block is loaded to the data buffer memory.

7. The method of claim 1, wherein the loading of the target data block from the volatile memory device to the data buffer memory, by the memory controller, in response to determining that the target data block is not loaded to the data buffer memory comprises:

determining, by the memory controller, whether the target data block is stored in the volatile memory device;

loading, by the memory controller, the target data block from the volatile memory device to the data buffer memory, in response to determining that the target data block is stored in the volatile memory device; and providing, by the memory controller, a fail response corresponding to the target data to the host device, in response to determining that the target data block is not stored in the volatile memory device.

8. The method of claim 1, wherein a speed of the main memory device is faster than a speed of the swap memory device.

9. The method of claim 8, wherein the main memory device includes a network-of-DRAM (Dynamic Random Access Memory).

10. The method of claim 1, wherein a level within a memory hierarchy of the swap memory device is lower than a level within a memory hierarchy of the main memory device, and wherein the level within the memory hierarchy of the swap memory device is higher than a level within a memory hierarchy of a storage device that is configured to communicate with the host device.

11. The method of claim 1, wherein the swap memory device provides a swap space to the host device.

12. A swap memory device comprising:

an input/output (I/O) circuit including an input buffer, a first data path, and a second data path;

a data buffer memory;

a volatile memory device configured to store a plurality of data blocks; and a memory controller, wherein the memory controller is configured to perform operations comprising:

storing a target data block including target data;

receiving a request corresponding to the target data of the target data block among the plurality of data blocks from a host device through the input buffer;

determining a first address of the target data and a second address of the target data block, based on the request;

providing the target data to the host device through the first data path of the I/O circuit, based on the first address; and providing the target data block to a main memory device through the second data path of the I/O circuit, based on the second address, wherein the determining of the first address of the target data and the second address of the target data block based on the request comprises:

determining, by the memory controller, whether the target data block is loaded to the data buffer memory;

in response to determining that the target data block is not loaded to the data buffer memory, loading, by the memory controller, the target data block from the volatile memory device to the data buffer memory; and determining, by the memory controller, the first address and the second address, after loading the target data block to the data buffer memory.

13. The swap memory device of claim 12, wherein the memory controller includes a first base address register and a second base address register, wherein the memory controller is further configured to perform operations comprising:

determining the first address, which is used to access the target data in a size of a byte unit size, by using the first base address register, based on the request; and determining the second address, which is used to access the target data block in a size of a block unit size, by using the second base address register, based on the request.

14. The swap memory device of claim 12, wherein the data buffer memory is configured to communicate with the I/O circuit, the volatile memory device, and the memory controller, wherein the memory controller is further configured to perform operations comprising:

before receiving the request, predicting that the target data are to be called;

before receiving the request, loading the target data block including the target data predicted to be called from the volatile memory device to the data buffer memory;

determining whether the target data block is loaded to the data buffer memory, based on the request; and determining the first address and the second address, in response to determining that the target data block is loaded to the data buffer memory.

* * * * *